(12) United States Patent
Birkemose et al.

(10) Patent No.: US 8,286,494 B2
(45) Date of Patent: Oct. 16, 2012

(54) MONITORING OF BLADE FREQUENCIES OF A WIND TURBINE

(75) Inventors: Bo Birkemose, Brande (DK); Henrik Stiesdal, Odense C (DK); Soeren Vinther, Herning (DK)

(73) Assignee: Siemens Aktiengesellschaft, München (DE)

( * ) Notice: Subject to any disclaimer, the term of this patent is extended or adjusted under 35 U.S.C. 154(b) by 212 days.

(21) Appl. No.: 12/682,351

(22) PCT Filed: Sep. 24, 2008

(86) PCT No.: PCT/EP2008/062766
§ 371 (c)(1),
(2), (4) Date: Apr. 9, 2010

(87) PCT Pub. No.: WO2009/047121
PCT Pub. Date: Apr. 16, 2009

(65) Prior Publication Data
US 2010/0250013 A1    Sep. 30, 2010

(30) Foreign Application Priority Data
Oct. 9, 2007 (DK) .................................. 2007 01456

(51) Int. Cl.
*G01H 1/06* (2006.01)
(52) U.S. Cl. .................. 73/660; 73/593; 416/61

(58) Field of Classification Search .............. 73/593, 73/660; 416/61; 415/118
See application file for complete search history.

(56) References Cited

U.S. PATENT DOCUMENTS

| | | | |
|---|---|---|---|
| 2004/0151577 A1* | 8/2004 | Pierce et al. | 415/4.1 |
| 2005/0276696 A1 | 12/2005 | LeMieux | |
| 2006/0001268 A1 | 1/2006 | Moroz | |
| 2006/0070435 A1* | 4/2006 | LeMieux et al. | 73/168 |
| 2009/0169357 A1* | 7/2009 | Slack | 415/26 |

FOREIGN PATENT DOCUMENTS

| | | |
|---|---|---|
| JP | 63159677 A | 7/1988 |
| JP | 2000018147 A | 1/2000 |
| JP | 2004036612 A | 2/2004 |
| JP | 2007231911 A | 9/2007 |
| WO | WO 99/57435 A1 | 11/1999 |
| WO | WO 01/33075 A1 | 5/2001 |
| WO | WO 2008/014935 A2 | 2/2008 |

* cited by examiner

*Primary Examiner* — Peter Macchiarolo
*Assistant Examiner* — Rose M Miller (57) ABSTRACT

One or more bolt gauges each with a built-in load cell are positioned on a blade bolt or a bearing bolt between a pitch bearing and a tightening means and tensioned by the securing means at the inside or the outside of a hub of a wind turbine. The bolt gauge then outputs a signal descending both from the tension from the bolt/securing means connection and the tension from the blade when the blade is vibrated due to wind forces and the rotation of the blade when the hub of the wind turbine is rotating.

14 Claims, 6 Drawing Sheets

MONITORING OF BLADE FREQUENCIES OF A WIND TURBINE

CROSS REFERENCE TO RELATED APPLICATIONS

This application is the US National Stage of International Application No. PCT/EP2008/062766, filed Sep. 24, 2008 and claims the benefit thereof. The International Application claims the benefits of Denmark application No. 200701456 DK filed Oct. 9, 2007. All of the applications are incorporated by reference herein in their entirety.

FIELD OF THE INVENTION

The present invention relates to a method for monitoring blade frequencies of a wind turbine and a monitoring system for performing the method.

BACKGROUND OF THE INVENTION

It is known to monitor blade frequencies of a wind turbine to monitor if the frequencies of each blade are changing due to e.g. material faults in the blades, lightning strikes or other influences. The monitoring is usually done by placing one or more fast responsive sensors like accelerometers, in each blade of a wind turbine as described in WO 99/57435 A1. This is an expensive solution because of the need of many expensive sensors.

On existing wind turbines which do not have the mentioned sensors built into the blades to monitor the blade frequencies, it is very difficult and expensive to build in the sensors afterwards as they have to be placed in each blade.

SUMMARY OF THE INVENTION

It is thus an object of the present invention to provide a method for monitoring blade frequencies of a wind turbine and a monitoring system for performing the method which is both easier to build into existing wind turbines and less expensive.

This object is solved by a method is solved by the method for monitoring blade frequencies of a wind turbine as claimed in claim 1 and by a monitoring system as claimed in claim 10. The depending claims contain further developments of the invention.

In the inventive method for monitoring blade frequencies of a wind turbine the wind turbine comprises a tower, a nacelle, a rotating hub with one or more pitch bearings with an inner ring and an outer ring. The outer ring is connected to the hub by bearing bolts and tightening means or nuts and the inner ring is connected to one or more rotating blades by a number of through holes in the inner ring fitted to a number of blade bolts and tensioned by a number of nuts or other tightening means. The wind turbine has one or more bolt gauges with built-in load cells each positioned on the blade bolts and/or bearing bolts between the pitch bearings and the nuts or other tightening means and tensioned by the nuts or other tightening means. Electrical signal descending and depending from the load or pressure on the bolt gauges and the built-in load cells are established and the electrical signals from the bolt gauges are used to measure the vibrations and frequencies of the blades due to wind forces on the wind turbine. The bolt gauges may output the electrical signals descending and depending from the load or pressure on the bolt gauges and the built-in load cells.

By the invention one or more bolt gauges 6 each with a built-in load cell (LC, not shown) are positioned on a blade bolt between a pitch bearing and a nut and tensioned by the nut at the inside or the outside of a hub of a wind turbine. The bolt gauge then outputs a signal descending both from the tension from the bolt/nut connection and the tension from the blade when the blade is vibrated due to wind forces and the rotation of the blade when the hub of a wind turbine is rotating.

If a specific kind of blade vibration is to be monitored like flap-wise vibration the bolt gauge is then positioned on a blade bolt which plane through the center of the bolt and the center of the blade is mainly perpendicular to the upper and/or lower surface also called the lee or wind-side of the blade. Note, that such a plane can also be regarded as being substantially perpendicular to the blade's chord. If the edge-wise vibrations or frequencies are to be monitored the bolt gauge is then positioned on a 90 degrees displaced blade bolt which plane through the center of the bolt and the center of the blade is mainly parallel with the upper and/or lower surface of the blade. Note, that such a plane can also be regarded as being substantially parallel to the blade's chord. Alternatively both an edge-wise and a flap-wise bolt gauge are positioned on a blade bolt as described above and thereby monitoring both edge-wise and flap-wise vibrations or frequencies. In other words, the inventive method may further comprise the step of measuring edge-wise and/or flap-wise vibrations and frequencies of the blades by using one or more bolt gauges. In this step, at least one bolt gauge can be located such that the location of the bolt at the inner ring or outer ring and the center of the respective ring lie on a line that extends substantially parallel to the chord of the blade for measuring edge-wise vibrations and frequencies and/or at least one bolt gauge can be located such that the location of the bolt at the inner ring or outer ring and the center of the respective ring lie on a line that extends substantially perpendicular to the chord of the blade for measuring flap-wise vibrations and frequencies. In particular, the inventive method may comprise the step of measuring both edge-wise and flap-wise vibrations and frequencies of the blades by using two bolt gauges each positioned on a blade bolt and/or bearing bolt which is displaced 90 degrees to the other blade bolt and/or bearing bolt.

Another alternative is to position a bolt gauge on one of the above mentioned blade bolts and also position a bolt gauge on a blade bolt displaced 180 degrees to the other blade bolt. Thereby a difference signal between the two bolt gauges is to be monitored giving an improved signal. In other words, the inventive method may further comprise the step of measuring edge-wise and/or flap-wise vibrations and frequencies of the blades by using one or two pairs of bolt gauges where each pair of bolt gauges is positioned on a blade bolt and/or bearing bolt and in which the bolt gauges of each pair are displaced by 180 degrees relative each other. This may, in particular, be based on measuring the difference signal between each pair of bolt gauges.

In a further step of the inventive method, the electrical signals from the bolt gauges may be amplified with an amplifier and sent by wire or wireless to a Main Computer or Controller. They may be stored or logged in the Main Computer or Controller. Further, a new frequency of each blade may be calculated by comparing each blade frequency to the other blade frequencies and using this comparing to calculate the change in each blade frequency. Alternatively, calculating a new frequency of each blade may be based on the difference between each blade frequency. In addition, the inventive method may comprise the step of setting an alarm and/or stopping the wind turbine when the new calculated frequency reaches a certain level.

According to another aspect of the invention, an inventive monitoring system monitoring the blade frequencies of a wind turbine comprises a tower, a nacelle, and a rotating hub with one or more pitch bearings with an inner ring and an outer ring. The outer ring is connected to the hub by bearing bolts and tightening means or nuts and the inner ring is connected to one or more rotating blades by a number of through holes in the inner ring fitted to a number of blade bolts and tensioned by a number of nuts or other tightening means. The monitoring system has one or more bolt gauges with built-in load cells each positioned on blade bolts and/or bearing bolts between the pitch bearings and the nuts or other tightening means and tensioned by the nuts or other tightening means. The bolt gauges may output electrical signals descending and depending from the load or pressure on the bolt gauges and the built-in load cells, in particular through wires. The inventive monitoring system is adapted to perform the inventive method.

The monitoring system may comprise two bolt gauges each positioned on a blade bolt and/or bearing bolt which is displaced 90 degrees to the other blade bolt and/or bearing bolt for measuring both edge-wise and flap-wise vibrations and frequencies of the blades. In other words, the monitoring system may comprise two bolt gauges each positioned on a blade bolt and/or bearing bolt where the blade bolt or baring bolt of the first one of the two bolt gauges is displaced 90 degrees relative to the blade bolt or bearing bolt of the second one of the two bolt gauges so as to allow for measuring both edge-wise and flap-wise vibrations and frequencies of the blades.

The monitoring system may further comprise at least one pair of bolt gauges where the pair of bolt gauges is positioned on a pair of blade bolts and/or bearing bolts. One of the blade bolts and/or bearing bolts of the pair is displaced 180 degrees relative to the other blade bolt and/or bearing bolt of the pair so as to allow for measuring a difference signal representing edge-wise and/or flap-wise vibrations and frequencies of the blades by the pair of bolt gauges.

Furthermore, the monitoring system may comprise at least two pairs of bolt gauges. The bolt gauges of each pair are positioned on a pair of blade bolts and/or a pair of bearing bolts where the blade bolts and/or bearing bolts of a pair are displaced 180 degrees relative to each other. The blade bolts and/or bearing bolts of different pairs of bolt gauges are displaced by 90 degrees relative to each other.

Furthermore, the inventive monitoring system may comprise one or more amplifiers connected to the bolt gauges and connected to a Main Computer or Controller through wires and slip rings or wireless. A storing or logging unit may be comprised in the Main Computer or Controller for storing or logging the signals from the bolt gauges.

In addition, the inventive monitoring system may further comprise an alarm unit in the Main Computer or Controller which sets an alarm and/or stops the wind turbine when the change of one or more blade frequencies compared to the other blade frequencies reaches a certain level.

Note that the above mentioned bolt gauges may, in particular, be located on the blade bolts. However, another alternative is to position the above mentioned bolt gauges on bearing bolts or on both bearing bolts and blade bolts. The main function of the bearing bolts is to secure an outer ring of the pitch bearing to the hub of the wind turbine, where an inner ring of the pitch bearing is carrying the blades by the blade bolts.

The signals from the bolt gauges descending from each load cell (LC) are normally electrically send to a Main Computer or Controller (MC) through wires connected to slip rings and amplified by an amplifier. The load cell signals could also be send wireless to the MC and amplified directly by the bolt gauges.

As described above each blade vibrations or frequencies are thereby monitored and stored or logged by the MC. Further a severe and alarming change in each blade frequency is monitored as each blade frequency is compared to the other blade frequencies and an alarm is set and/or the wind turbine is stopped if a given level is reached.

BRIEF DESCRIPTIONS OF THE DRAWINGS

The invention will now be described in further details with reference to the accompanying drawings in which.

DETAILED DESCRIPTION

Figure 1:
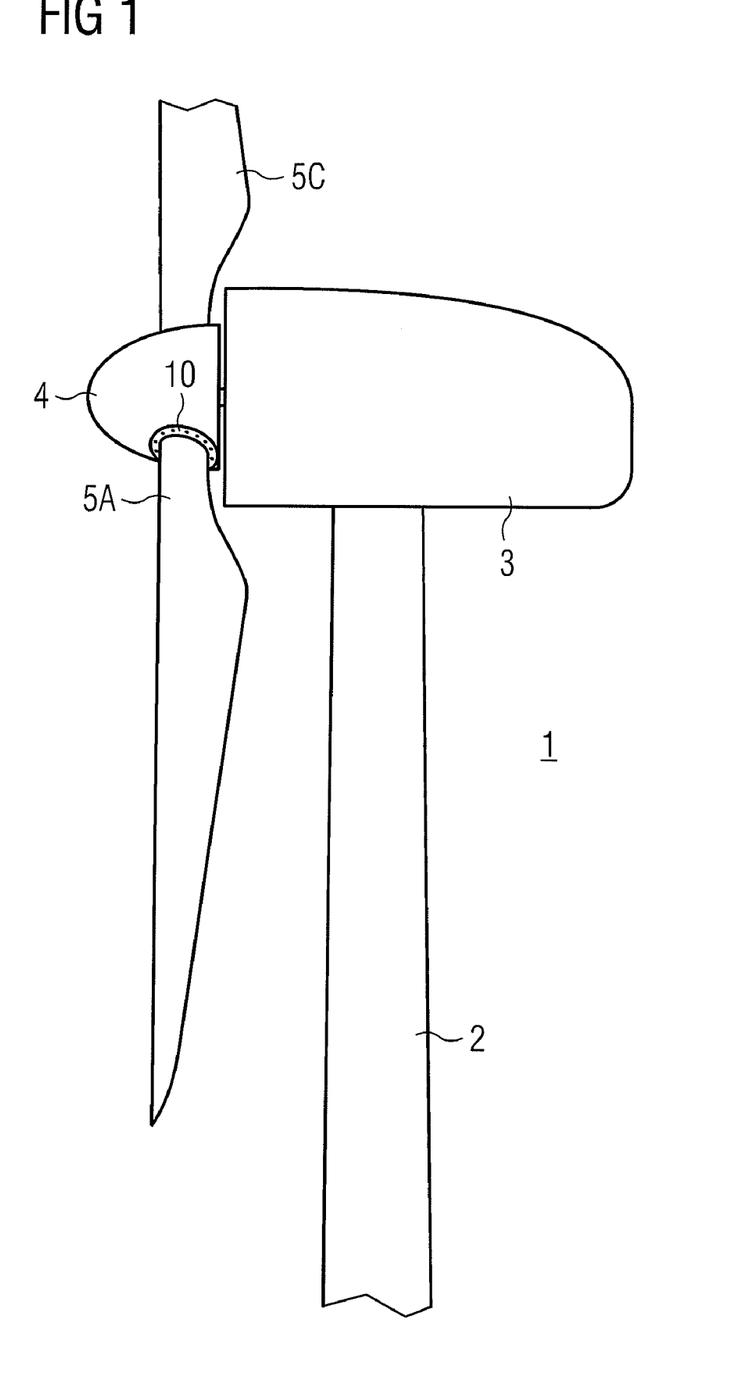
FIG. 1 shows a wind turbine according to the invention.
Figure 2:
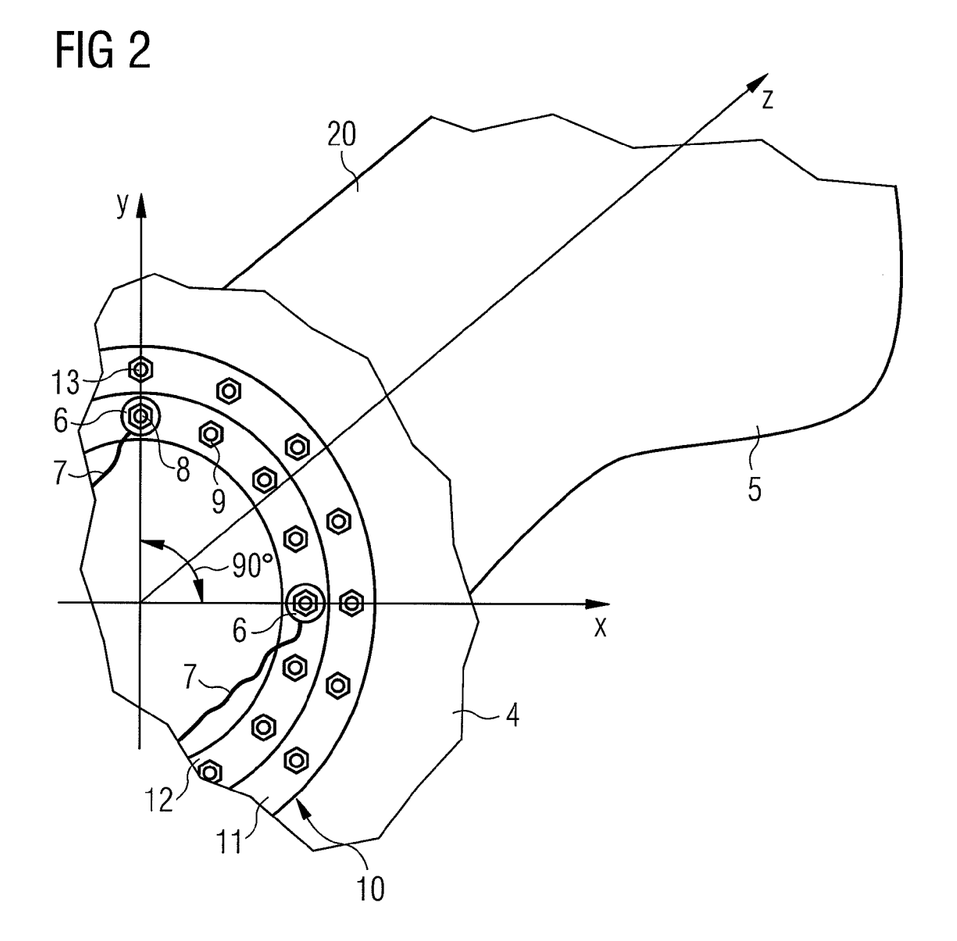
FIG. 2 shows a sectional view of a wind turbine according to the invention showing the mounting of a blade with positioned bolt gauges.
Figure 3:
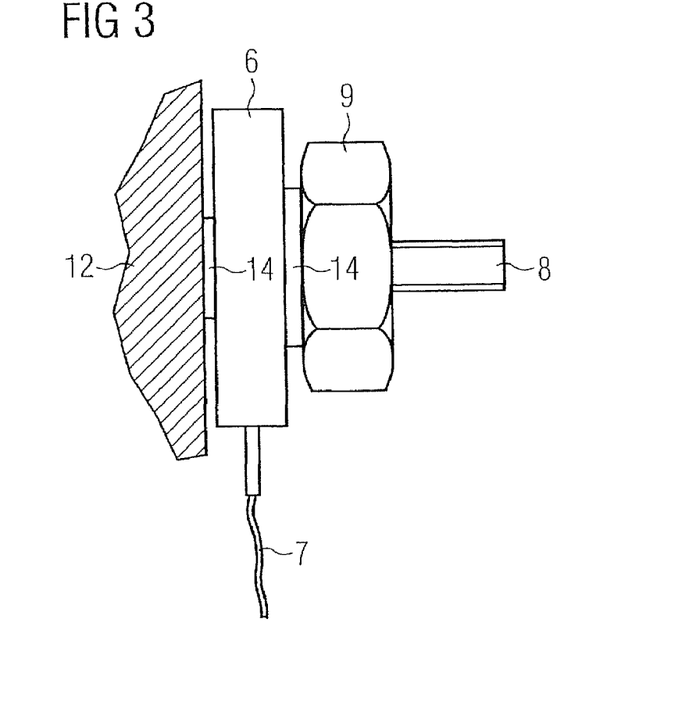
FIG. 3 shows a sectional view of a bolt gauge positioned on a blade bolt.

The monitoring system is build into a wind turbine 1 as shown on FIGS. 1, 2 and 3 comprising a tower 2, a nacelle 3, a hub 4 with pitch bearings 10 and one or more rotating blades 5 (5A, 5B (not shown), 5C or more blades) each connected to a pitch bearing 10 with an inner ring 12 and an outer ring 11 by a number of through holes in the pitch bearing fitted to a number of blade bolts 8 and tensioned by a number of nuts 9 as shown on FIG. 2. The through holes are located in an inner ring 12 of the pitch bearing. As also shown on FIG. 2 each blade bolt 8 and nut 9 are connected to the pitch bearing 10 in the x-y plane and the blade 5 is extending radially from the x-y plane through the z-direction (which is substantially parallel to the blade's span) with the blade upper and/or lower surface 20 mainly parallel to the x-direction. The monitoring system comprises or consists of one or more bolt gauges 6 each with a built-in load cell (LC, not shown) and positioned on a blade bolt 8 between a pitch bearing 10 and a nut 9 and tensioned by the nut 9 at the inside or outside of the hub 4. Preferably as shown on FIG. 3 a washer 14 is put on both sides of the bolt gauge 6 on the blade bolt 8. The bolt gauge 6 then outputs a signal descending both from the tension from the bolt/nut connection and the tension from the blade 5 when the blade 5 is vibrated due to wind forces and the rotation of the blade 5 when the hub 4 of a wind turbine 1 is rotating.

If a specific kind of blade vibration is to be monitored like flap-wise vibration, i.e. vibration in the y-direction (perpendicular to the upper and/or lower blade surface 20 and, hence, also substantially perpendicular to the blade's chord line, i.e. the line connecting the blade's leading edge with the blade's trailing edge), the bolt gauge 6 is then positioned on a blade bolt 8 which plane through the center of the bolt and the center of the blade is mainly perpendicular to the upper and/or lower surface 20 also called the lee or wind-side of the blade 5. In other words, the location of the blade bolt 8 at the inner ring 12 and the center of the inner ring 12 lie on a line that extends substantially in parallel to the x-direction and, hence, substantially parallel to the chord of the blade. In the present embodiment, the line coincides with the x-direction.

If the edge-wise vibrations or frequencies, i.e. frequencies in the x-direction (parallel to the upper and/or lower blade surface 20 and, hence, also substantially parallel to the blade's chord line), are to be monitored the bolt gauge 6 is then positioned on a 90 degrees displaced blade bolt 8 which plane through the center of the bolt 8 and the center of the blade 5 is mainly parallel with the upper and/or lower surface 20 of the blade 5. In other words, the location of the blade bolt 8 at the inner ring 12 and the center of the inner ring 12 lie on a line that extends substantially in parallel to the y-direction and, hence, substantially perpendicular to the chord of the blade. In the present embodiment, the line coincides with the y-direction.

Alternatively both an edge-wise and a flap-wise bolt gauge 6 are positioned on a blade bolt 8 as described above and thereby monitoring both edge-wise and flap-wise vibrations or frequencies, as it is shown in FIG. 2.

Figure 5:
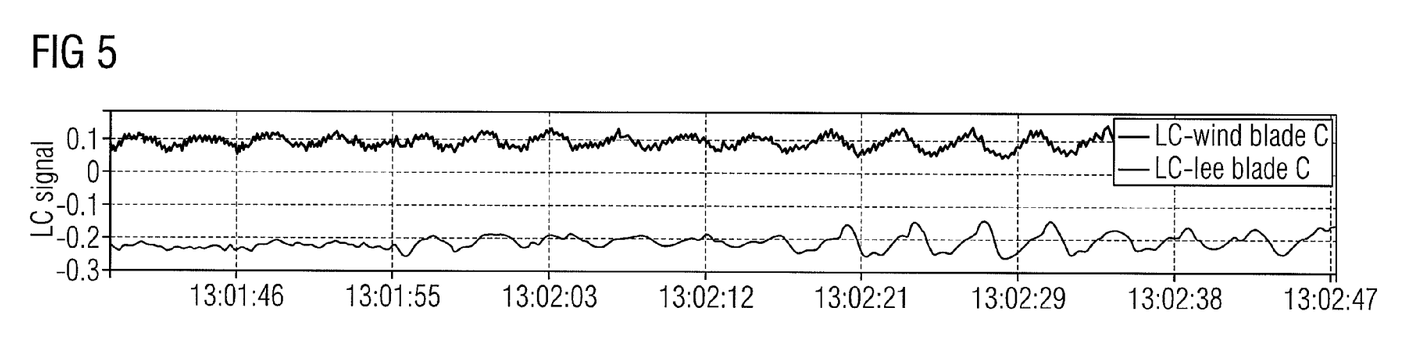
FIG. 5 shows the load cell (LC) signals from two bolt gauges displaced 180 degrees to each other positioned on blade bolts.
Figure 6:
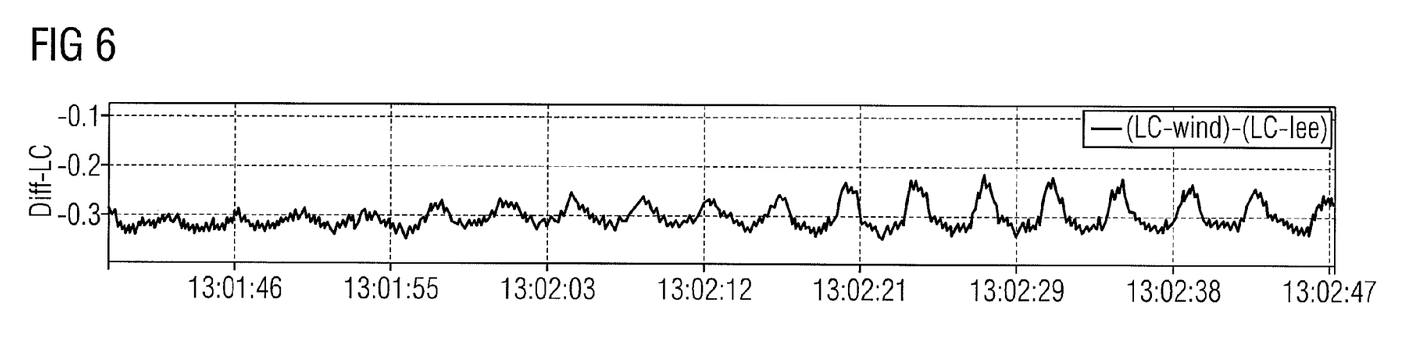
FIG. 6 shows the difference signal between the two LC-signals from FIG. 5.

Another alternative is to position a bolt gauge 6 on one of the above mentioned blade bolts 8 and also position a bolt gauge 6 on a blade bolt 8 displaced 180 degrees to the other blade bolt 8 along the inner ring's 12 circumference. Thereby a difference signal between the two bolt gauges 6 is to be monitored giving an improved signal as shown on FIGS. 5 and 6. FIG. 5 shows two flap-wise frequencies signals where the upper signal is descending from a load cell (LC) from a bolt gauge 6 where the load is loosened while the lower signal is descending from a load cell from a bolt gauge 6 displaced 180 degrees to the other bolt gauge 6, where the load is increased, as a negative signal indicates a larger pressure on the bolt gauge 6. On a typical large wind turbine in the size of 2.3 MW power production, bolt gauges are mounted with a tension force of 400 kN which is then the static load or pressure of the load cell of a bolt gauge 6 and the load cell is e.g. able to measure up to 750 kN, depending on the size of the bolt gauge 6 and load cell.

Figure 8:
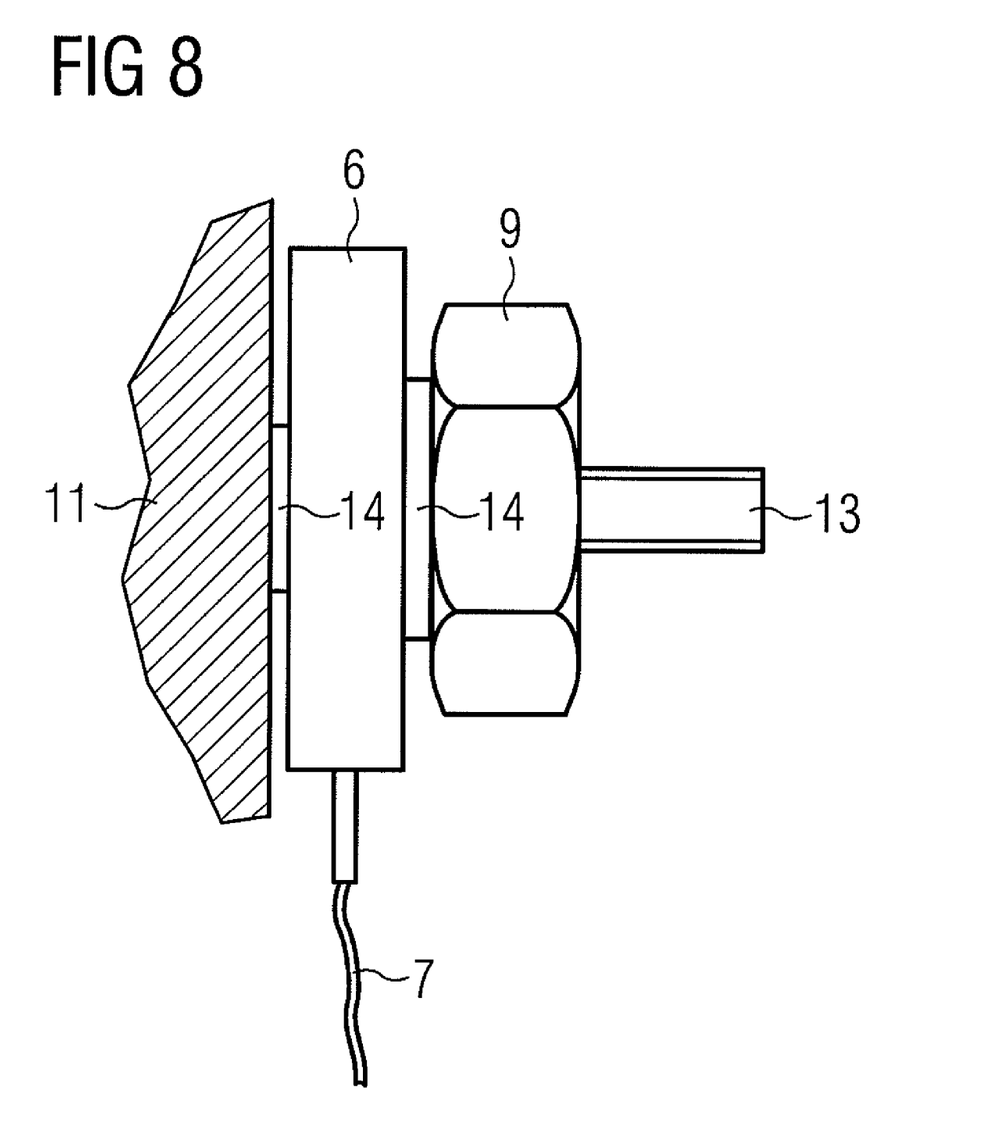
FIG. 8 shows a sectional view of a bolt gauge positioned on a bearing bolt.

Yet another alternative is to position the above mentioned bolt gauges 6 on bearing bolts 13, as shown in FIG. 8, or on both bearing bolts 13 and blade bolts 8. The main function of the bearing bolts 13 is to secure an outer ring 11 of the pitch bearing 10 to the hub 4 of the wind turbine 1, where an inner ring 12 of the pitch bearing 10 is carrying the blade 5 by the blade bolts 8.

Other tightening means like a clamp or glue combined with a clamp could be used instead of the mentioned nuts (9).

Figure 4:
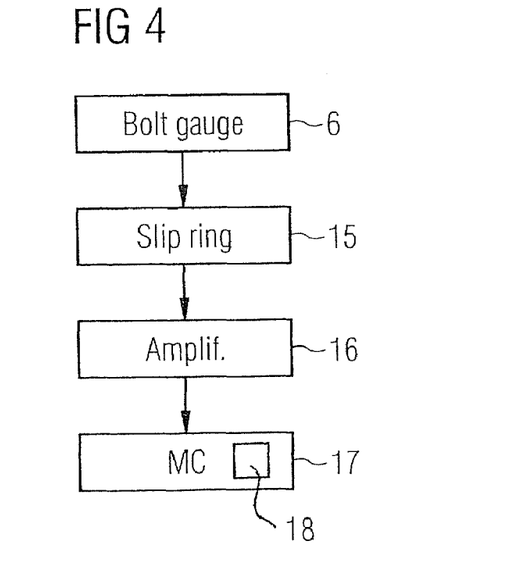
FIG. 4 shows the electrical connection between each bolt gauge and the Main Computer or Controller (MC).

The signals from the bolt gauges 6 descending from each load cell (LC) are normally electrically sent to a Main Computer or Controller (MC) 17 through wires 7 connected to slip rings 15 and amplified by an amplifier 16 as shown on FIG. 4. The load cell signals could also be send wireless to the MC 17 and amplified directly by the bolt gauges 6.

As described above each blade vibrations or frequencies are thereby monitored and stored or logged by a storing or logging unit (not shown) in the MC 17. Further a severe and alarming change in each blade frequency is monitored by an alarm unit 18 in the MC 17 as each blade frequency is compared to the other blade frequencies and an alarm is set and/or the wind turbine 1 is stopped by the alarm unit if a given level is reached.

The flap-wise and especially the edge-wise frequency of the blade 5 will be varying with changes in the temperature of the blade 5. There will also be some initial difference in the blade frequencies e.g. because of different mass distributions. Therefore the detection of the frequency change of one blade 5 has to be with respect to the other blades 5. A method for detecting relative changes in the blade frequency is described in the formula below. The blade frequency for e.g. blade 5A ($f_A$) is subtracted by the mean value of the others blades ($F_B$ and $F_C$). The initial difference ($df_{A\,init}$) is subtracted to remove the initial deviation. This could be found by calculating the mean value for e.g. one day.

$$df_A = f_A - \frac{F_B + F_C}{2} - df_{A\_init}$$

$$df_B = f_B - \frac{F_A + F_C}{2} - df_{B\_init}$$

$$df_C = f_C - \frac{F_A + F_B}{2} - df_{C\_init}$$

Integrating the absolute value of the difference ($df_{A\,\ldots\,C}$) subtracted by an allowed difference ($df_{allowed}$) gives a signal that increases fast if there is great difference and slow when having small deviations. When the DiffLev$_A$ (the same analogy for DiffLev$_B$ and DiffLev$_C$) reaches a given level an alarm should be set and the turbine should be stopped.

$$\text{DiffLev}_A = \text{DiffLev}_A + |df_A| - df_{allowed} @ \text{DiffLev}_A \geq 0$$

Figure 7:
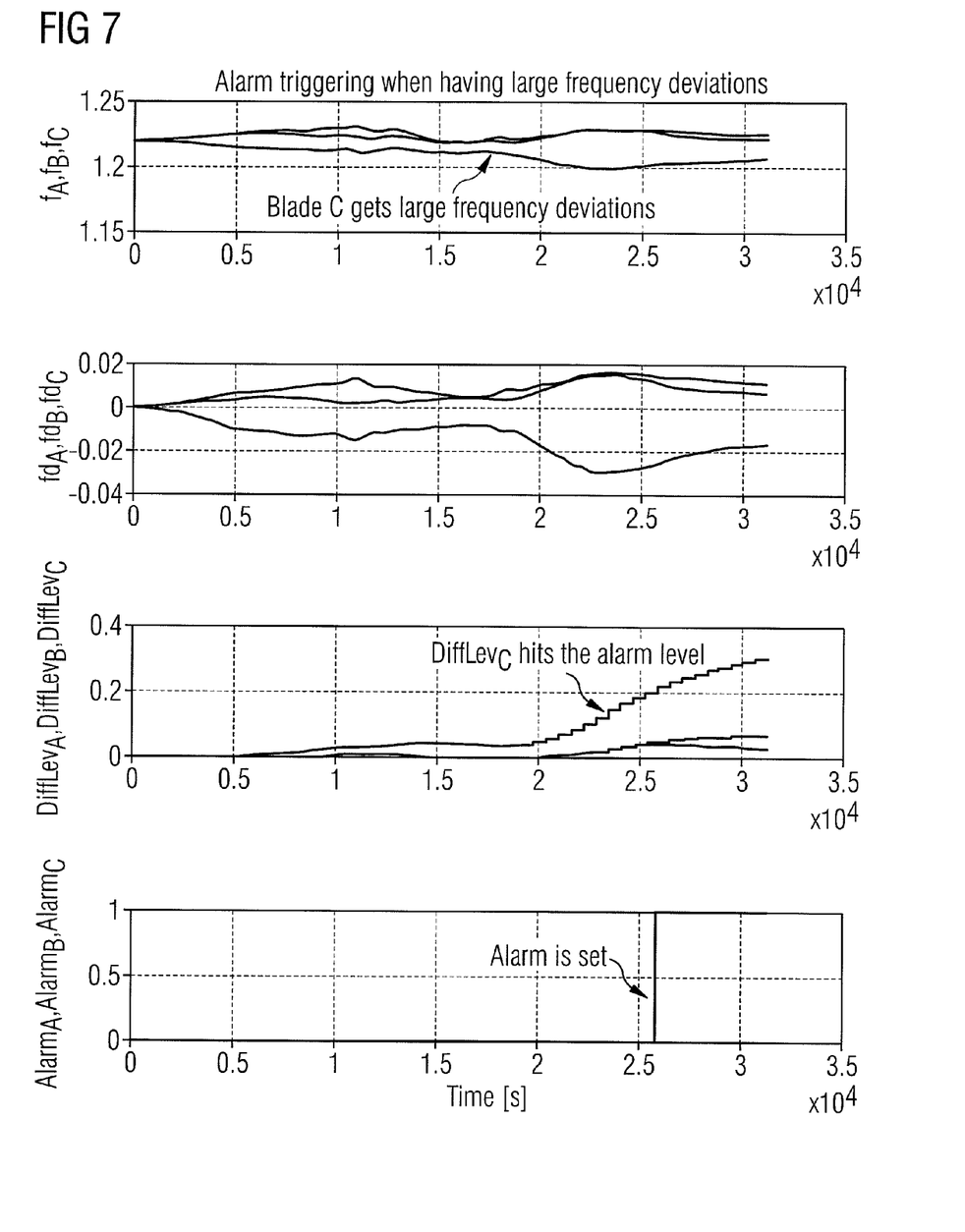
FIG. 7 shows an example where the blade C edge-wise frequency is decreasing more than the frequencies of the other blades and an alarm is set.

FIG. 7 shows an example where the blade C edge-wise frequency is decreasing and the frequencies of blade A and blade B are more stable. When the allowed difference ($fd_C$) is reached, the difference level (DiffLev$_C$) begins to increase and trigs or sets the alarm, when it reaches 0.2.

The frequency difference could also be calculated by looking at the ratio between the frequencies instead of the absolute difference:

$$df_{BA} = \frac{F_B}{F_A} - df_{BA\_init}$$

$$df_{CA} = \frac{F_C}{F_A} - df_{CA\_init}$$

Frequency difference level detection:
1. If the difference is varying as a function of e.g. generator speed at normal operation without blade damage, the difference $df_{A\,\ldots\,C}$ should be integrated with a number of integrator which should perform the integration over a given speed interval.
2. The alarm could be set when a given maximum deviation is reached, without using the integrating method.

Compared to the cited prior art the present invention provides a cheap possibility to monitor the blade frequencies as bolt gauges 6 are much cheaper than the used three-axis accelerometers in the cited prior art and as it is quite easier to install the bolt gauges 6 on existing blade bolts 8 or on existing bearing bolts 13 than installing the accelerometers in existing blades of existing wind turbines.

The invention claimed is:
1. A method for monitoring blade frequencies of a wind turbine, comprising:
   providing a first bolt gauge, which includes a built-in load cell;
   providing a rotating hub including a pitch bearing, which includes an inner ring and an outer ring, the outer ring is connected to a hub by a plurality of bolts, each of which is secured by a tightening means, the inner ring is connected to a plurality of rotating blades by a plurality bolts, each of which is secured by a tightening means, the first bolt gauge positioned on a first bolt of the plurality of bolts of the outer ring between the pitch bearing and the tightening means of the first bolt, or the first bolt gauge positioned on a first bolt of the plurality of bolts of the inner ring between the pitch bearing and the tightening means of the first bolt, or detecting, a load or pressure via the bolt gauge;

receiving an electrical signal for the detected load or detected pressure which is used to measure the vibrations and/or frequencies of the plurality of rotating blades;

calculating a new frequency for the rotating blades by comparing each blade frequency to the other blade frequencies; and using this comparing to calculate the change in each blade frequency.

2. The method according to claim 1, further comprising: measuring a edge-wise or flap-wise vibration via the first bolt gauge.

3. The method according to claim 1, further comprising: providing a second bolt gauge displaced 90 relative to the first bolt gauge, the second bolt gauge is positioned on a second bearing bolt of the plurality of bearing bolts of the same ring as first bolt gauge between the pitch bearing an the tightening means of the second bolt; and measuring edge-wise and/or flap-wise vibrations and frequencies of the rotating blades via the first and second gauges.

4. A method according to claim 3, further comprising: providing a third bolt gauge and a fourth bolt gauge on the same ring as the first and second bolt gauge, each bolt gauge displaced 90 relative to an adjacent bolt gauge; and measuring edge-wise and/or flap-wise vibrations and frequencies of the rotating blades via the first, second, third, and forth gauges.

5. A method according to claim 4, wherein a first gauge pair includes the first and second bolt gauges, a second gauge pair includes the third and fourth bolt gauges, and the method further comprising measuring the difference signals between each pair of bolt gauges.

6. The method according to claim 1, further comprising: amplifying the electrical signals from the bolt gauges by an amplifier; and transmitting the electrical signal by wire or wirelessly to a Main Computer or Controller and storing or logging the signals in the Main Computer or Controller.

7. The method according to claim 1, further comprising: setting an alarm or stopping the wind turbine when the new calculated frequency reaches a certain level.

8. A method for monitoring blade frequencies of a wind turbine, comprising:

providing a first bolt gauge, which includes a built-in load cell;

providing a rotating hub including a pitch bearing, which includes an inner ring and an outer ring, the outer ring is connected to a hub by a plurality of bolts. each of which is secured by a tightening means, the inner ring is connected to a plurality of rotating blades by a plurality bolts, each of which is secured by a tightening means, the first bolt gauge positioned on a first bolt of the plurality of bolts of the outer ring between the pitch bearing and the tightening means of the first bolt, or the first bolt gauge positioned on a first bolt of the plurality of bolts of the inner ring between the pitch bearing and the tightening means of the first bolt, or detecting a load or pressure via the bolt gauge;

receiving an electrical signal for the detected load or detected pressure which is used to measure the vibrations and/or frequencies of the plurality of rotating blades; and calculating a new frequency for a first blade and a second blade based on a difference between a first blade frequency and a second blade frequency.

9. The method according to claim 8, further comprising: setting an alarm or stopping the wind turbine when the new calculated frequency reaches a certain level.

10. A monitoring system monitoring the blade frequencies of a wind turbine comprising:

a first bolt gauge, which includes a built-in load cell; and a rotating hub including a pitch bearing, which includes an inner ring and an outer ring, the outer ring is connected to the hub by a plurality of bearing bolts, each of which is secured by a tightening means, wherein the inner ring is connected to at least one rotating blade by a plurality blade bolts, each of which is secured by a tightening means, the first bolt gauge positioned on a first bearing bolt of the plurality of bearing bolts between the pitch bearing and the tightening means of the first bearing bolt, or the first bolt gauge positioned on a second blade bolt of the plurality of blade bolts between the pitch bearing and the tightening means of the first blade bolt;

an amplifier connected to the bolt gauge and connected to a Main Computer or Controller via wires and slip rings or wirelessly; and an alarm unit in the Main Computer or Controller which sets an alarm or stops the wind turbine when the change of one or more blade frequencies compared to the other blade frequencies reaches a certain level, wherein the first bolt gauge positioning is used to monitor blade frequencies.

11. The monitoring system according to claim 10, further comprising:

a first pair of bolt gauges, which includes the first bolt gauge, and a second bolt gauge displaced 90 relative to the first bolt gauge, the pair of bolt gauges measure edge-wise and flap wise vibrations and frequencies of the at least one blade wherein when the first bolt gauge is positioned on the first bearing bolt the second bolt gauge is positioned on a second bearing bolt of the plurality of bearing bolts between the pitch bearing and the tightening means of the second bearing bolt, and when the first bolt gauge is positioned on the first blade bolt the second bolt gauge is positioned on a second blade bolt of the plurality of blade bolts between the pitch bearing and the tightening means of the second blade bolt.

12. The monitoring system according to claim 10, further comprising:

a first pair of bolt gauges, which includes the first bolt gauge, and a second bolt gauge displaced 180 degrees relative to the first bolt gauge in order to measure a difference signal representing edge-wise and/or flap-wise vibrations and frequencies of the at least one blade, wherein when the first bolt gauge is positioned on the first bearing bolt the second bolt gauge is positioned on a second bearing bolt of the plurality of bearing bolts between the pitch bearing and the tightening means of the second bearing bolt, and when the first bolt gauge is positioned on the first blade bolt the second bolt gauge is positioned on a second blade bolt of the plurality of blade bolts between the pitch bearing and the tightening means of the second blade bolt.

13. The monitoring system according to claim 12, further comprising:

a second pair of bolt gauges displaced 90 degrees from the first pair of bolt gauges, which includes a third bolt gauge, and a fourth bolt gauge displaced 180 degrees relative to the third bolt gauge wherein when the third bolt gauge is positioned on a third bearing bolt of the plurality of bearing bolts the fourth bolt gauge is positioned on a fourth bearing bolt of the plurality of bearing bolts between the pitch bearing and the tightening means of the fourth bearing bolt, and when the third bolt gauge is positioned on the fourth blade bolt of the plurality of blade bolts the fourth bolt gauge is positioned on a fourth blade bolt of the plurality of blade bolts between the pitch bearing and the tightening means of the fourth blade bolt.

14. The monitoring system according to claim 10, further comprising:

a storing or logging unit in the Main Computer or Controller for storing or logging the signals from the bolt gauge.

* * * * *